(12) United States Patent
John et al.

(10) Patent No.: US 11,351,730 B2
(45) Date of Patent: Jun. 7, 2022

(54) STEREOLITHOGRAPHY DEVICE

(71) Applicant: Ivoclar Vivadent AG, Schaan (LI)

(72) Inventors: Zeno John, Triesenberg (LI); Lorenz Josef Bonderer, Sargens (CH)

(73) Assignee: Ivoclar Vivadent AG, Schaan (LI)

( * ) Notice: Subject to any disclaimer, the term of this patent is extended or adjusted under 35 U.S.C. 154(b) by 181 days.

(21) Appl. No.: 16/747,210

(22) Filed: Jan. 20, 2020

(65) Prior Publication Data

US 2020/0238618 A1 Jul. 30, 2020

(30) Foreign Application Priority Data

Jan. 24, 2019 (EP) .................................... 19153519

(51) Int. Cl.
*B29C 64/259* (2017.01)
*B33Y 30/00* (2015.01)
*B33Y 40/00* (2020.01)
*B33Y 50/02* (2015.01)
*B29C 64/321* (2017.01)
*B29C 64/124* (2017.01)
*B29C 64/393* (2017.01)
*B65D 1/02* (2006.01)
*B65D 1/44* (2006.01)
*B29C 64/343* (2017.01)
*B29C 64/307* (2017.01)

(52) U.S. Cl.
CPC .......... *B29C 64/259* (2017.08); *B29C 64/124* (2017.08); *B29C 64/321* (2017.08); *B29C 64/393* (2017.08); *B33Y 30/00* (2014.12); *B33Y 40/00* (2014.12); *B33Y 50/02* (2014.12); *B65D 1/0246* (2013.01); *B65D 1/44* (2013.01); *B29C 64/307* (2017.08); *B29C 64/343* (2017.08); *B65D 2203/10* (2013.01)

(58) Field of Classification Search
CPC ... B29C 64/259; B29C 64/321; B29C 64/124; B29C 64/393; B29C 64/307; B29C 64/343; B33Y 30/00; B33Y 40/00; B33Y 50/02; B65D 1/0246; B65D 1/44; B65D 2203/10
USPC .................................................. 425/145, 375
See application file for complete search history.

(56) References Cited

U.S. PATENT DOCUMENTS

| 4,844,144 | A | 7/1989 | Murphy et al. |
|---|---|---|---|
| 8,221,671 | B2 | 7/2012 | Hull et al. |
| 9,555,584 | B2 | 1/2017 | Costabeber |
| 9,878,496 | B2 | 1/2018 | Zenere |
| 10,723,066 | B2 | 7/2020 | Costabeber |
| 2005/0280424 | A1 | 12/2005 | Qu et al. |
| 2006/0042376 | A1 | 3/2006 | Reusche et al. |
| 2008/0088595 | A1 | 4/2008 | Liu et al. |

(Continued)

*Primary Examiner* — Joseph S Del Sole
*Assistant Examiner* — Lawrence D. Hohenbrink, Jr.
(74) *Attorney, Agent, or Firm* — Ann M. Knab; Thad McMurray

(57) ABSTRACT

The invention relates to a stereolithography device having a replaceable bottle to receive printing material, which bottle may be stored in or on a bottle holder and from which printing material may be withdrawn into the stereolithography device by means of a device-sided holder. A filling level sensor is attached to the bottle holder by which a filling level of the printing material in the bottle can be detected. A mini memory device is associated to the bottle where the stereolithography device stores information regarding the printing material in the bottle, in particular the filling level thereof.

16 Claims, 5 Drawing Sheets

(56) References Cited

U.S. PATENT DOCUMENTS

| | | | |
|---|---|---|---|
| 2008/0250796 A1 | 10/2008 | Clugston et al. | |
| 2009/0009195 A1 | 1/2009 | Seguine | |
| 2009/0165552 A1 | 7/2009 | Sieh et al. | |
| 2009/0224776 A1 | 9/2009 | Keith | |
| 2009/0301189 A1 | 12/2009 | Ross, Jr. et al. | |
| 2015/0056320 A1* | 2/2015 | Costabeber | B29C 64/124 |
| | | | 425/169 |
| 2017/0057174 A1* | 3/2017 | Megretski | B29C 64/20 |
| 2018/0370136 A1* | 12/2018 | Stadlmann | B29C 64/259 |
| 2019/0283323 A1 | 9/2019 | Pokorny et al. | |
| 2021/0023787 A1* | 1/2021 | Busato | B29C 64/264 |

* cited by examiner

STEREOLITHOGRAPHY DEVICE

CROSS-REFERENCE TO RELATED APPLICATIONS

This application claims priority to European patent application No. 19153519.4 filed on Jan. 24, 2019, the disclosure of which is incorporated herein by reference in its entirety.

TECHNICAL FIELD

The present invention relates to a stereolithography device.

BACKGROUND

It has been known for long that in stereolithography equipment or devices, cartridge-like bottles are used to hold the printing material. Compared to freely accessible containers for the printing material, such bottles and cartridges have the advantage that they are contamination-safe and, in particular, free radicals of monomers cannot result in contamination of the environment by the printing material.

Typically, the printing material is very sensitive to light, especially when being stored. Therefore the bottle is colored in black, so that the filling level of the bottle is not visible from the outside.

The printing material is comparatively expensive. Therefore, efforts have been made to use up the amount of printing material in the bottle as completely as possible. The printing material from the bottle is therefore introduced into a trough or a tub, which provides some storage capacity for the liquid printing material. For stereolithography, however, a certain filling level of the tub is indispensable to enable slicing. For example, the construction platform must be submersible in the printing material and movable in the Z-direction during slicing.

It has become known to calculate the consumption of printing material during slicing.

However, printing by stereolithography is an extremely complex process, so that in practice the consumption of printing material significantly deviates from the theoretical values.

Another problem resides in that typically at least three different types of printing materials are required. For different object requirements or indications, e.g. in the dental field, different materials are used which would show unwanted material properties if mixed.

These materials are incompatible with each other, so it is important to avoid cross-contamination. Typically, this is achieved by different color marking of the bottles and tubs concerned.

However, it is not easy to avoid cross-contamination with stereolithography devices.

SUMMARY OF THE INVENTION

On the other hand, the object of the invention is to provide a stereolithography device and a bottle, which are significantly improved compared to the organizational processes in stereolithography, without which organizational processes significant additional effort would be required.

The bottle may be any shape or form designed to fil into the stereolithography device and preferably is fitted to the stereolithography device by a holder of the stereolithography device. Reference is hereby made to US 20190283323, which is hereby incorporated by reference in its entirety and which discloses examples of containers and holders useful in the stereolithography device of the present invention.

According to the invention, this object will be solved by the claims. Advantageous further embodiments will arise from the subclaims.

According to the invention, it is provided to measure the filling level of the printing material directly in the bottle. This may be done on the bottle or adjacent to the bottle, and the filling state is stored in a special memory device. This is placed anywhere in the stereolithography device, particularly on the bottle, and also stores information about the printing material in the bottle. This includes the type of material itself and the current filling level.

Examples of printing materials, include but are not limited to stereolithography light curing plastics (photopolymers) such as vinyl ester resins, acryl resins, epoxy resins, wax materials and model materials along with any materials set forth in U.S. Pat. Nos. 9,387,056 and 4,844,144, which are both incorporated herein by reference in their entirety.

The mini memory device is designed such that part of the memory, in particular the part concerning the type of printing material, cannot be changed, while another part, in particular the part concerning the filling level, can be changed.

The invention is not limited to the use of bottles in the proper sense; instead, according to the invention, any other suitable container which is closed or nearly closed may be used.

Examples of materials used for the container or bottle include, but are not limited to, thermoplastic polymers such as high density polyethylene (HDPE), polypropylene, polyamide, and the like.

The invention is preferably used in connection with the stereolithography device according to the European patent application EP 18 162 320.8, and corresponding US2019283323A1, which is fully incorporated herein by reference.

According to the invention, it is particularly advantageous for the level sensor to perform exact detection, when a specified residual quantity is in the bottle. A level sensor may as well be implemented in the sense that the exact level is displayed and stored. According to the invention, however, a switching sensor is preferred, i.e. a sensor that emits a first signal above a certain level and a second signal below a certain level. The first signal indicates that the bottle is still sufficiently filled with printing material, and the second signal indicates that the filling level is no longer sufficient, so that the bottle should be replaced.

Examples of sensors useful herein include, but are not limited to, capacitive sensors, ultrasonic sensors and the like along with those set forth in US 20050280424, 20080088595, 20080250796, 20090009195, 20090165552, 20090224776, 20090301189, 20060042376, which are hereby incorporated by reference in their entirety.

It is preferable that the sensor has a range of from about 2 to 30 mm, more preferably from about 4 to 15 mm and preferably about 8 mm from the liquid medium or the bottle to be monitored. According to the invention, it is provided for the mini storage device assigned to the bottle to be able to be read and evaluated by the stereolithography device. This means that the stereolithography device can detect the level stored in the mini storage device and/or any other information relating to the printing material in the bottle.

Accordingly, the stereolithography device comprises a mini storage readout device which may preferably be connected to an information writing device, the writing device entering information into the mini storage device, for example, concerning the level of the bottle.

According to the invention, it is advantageous for the filling level indicator to simultaneously reproduce the filling level of the bottle with accuracy, so that the stereolithography device with its control device may independently decide whether the filling level, i.e. the printing material present in the bottle, is sufficient for carrying out the upcoming construction job.

According to the invention, the dual function of the mini memory device is particularly advantageous. It not only stores the filling level, but also the relevant printing material and, if required, stores further details concerning the printing material in the bottle, such as the date of manufacture, the expiry date, etc. This enables the stereolithography device to decide, via its control device, whether the respective printing material is suitable for the upcoming construction job or not.

According to the invention, it is particularly advantageous for the relevant information to be able to be maintained when the bottle is replaced. As the bottle approaches the bottle holder in the stereolithography device, a data link is established between the mini memory device on the bottle and the corresponding transmitter/receiver for the mini memory device in the stereolithography device. A new reading process of the mini memory device is performed so that the stereolithography device receives information about which and how much printing material is available and, for example, whether the expiration date has not yet expired.

In a modified embodiment, a corresponding memory device, which may also be referred to as a mini memory device, is available in the stereolithography device itself. The bottle is identified by a unique code on the bottle, for example a QR code, so that the corresponding memory area in the mini memory device corresponding to the bottle can be read when the bottle is inserted.

However, it is preferable to implement the mini memory device on the bottle, in particular as an RFID tag that is suitable for near field communication (NFC) and thus containing information about the printing material on the bottle itself.

The RFID tag may be placed at any suitable location suitable for NFC transmission and reception. The transmitter/receiver device of the bottle is preferably equipped with a suitable antenna, through which the bidirectional communication with the RFID tag is possible.

In an advantageous embodiment the bottle can be mounted pivotably, therefore reference should be made to the already mentioned European patent application No. 18 162 320.8. In the upright state, the bottle is operational and ready for delivery of printing material. In this state, the communication between the RFID antenna and the RFID tag is also possible, and while printing material is fed from the bottle into the tub, the filling level of the bottle is monitored.

The level sensor may be mounted on the bottle in any suitable manner. It is preferably designed as a capacitive sensor, which detects at a lower end of the bottle whether printing material is present adjacent to it or not, i.e. air.

The RFID tag or chip may have including, but not limited to, a memory with 28 blocks of 4 bytes each. Dimensions may include, but are not limited to 2×2 mm in the RFID tag with an antenna of approzimated 1×2 cm.

In another favorable embodiment of the invention, the control device of the stereolithography device, which is already designed for communication with an RFID tag, is connected to another RFID antenna. This detects the Z-axis of the construction platform, i.e. the vertical movement, and another RFID tag is attached to the construction platform for this purpose. This makes it possible to determine when the construction platform is in the starting position, which is advantageous for controlling propulsion thereof. The control device may have digital I/O's (input/output) whereby a sensor is coupled to one of the I/O's: the input is cyclically polled and if the sensor state has changed (e.g., from 0 to 1 or vice versa) an interrupt is issued causing the control device to, e.g., display a warning display message such as "Bottle is almost empty" The control device may be, but is not limited to, a CPU, embedded controller, ASIC, and the like.

In another advantageous embodiment, the consumption of the printing material during slicing is calculated in addition to the recording of the filling level via the filling level sensor. This allows rough estimation of when the printing material could run out.

It is possible to include the RFID tag on the bottle in the control system only if a certain threshold value of consumption is reached according to the calculation, i.e. if, according to the theoretical calculation, half of the printing material in the bottle should have been used.

Detection at the bottle can preferably be carried out cyclically. For example, the control device can detect several times per second whether the state has changed. This also applies to recording the position of the cartridge, i.e. whether the bottle is in the upright or lying position. The filling level sensor is also preferred to be interrogated at short intervals.

The inventive solution also allows realization of a safety device. For example, this blocks the delivery of printing material if the sensors indicate that the bottle is positioned erroneously so that there is no liquid-tight reception. In this case, an alarm signal is preferably output.

In particular, the safety function ensures that the construction process is started not before at least the cylinder and the tub and optionally the construction platform are in the correct position and are operational so that release can take place.

In an advantageous embodiment, in addition to signaling the information on the bottle in the mini memory device to the control device, a display device indicates which material is present in the bottle.

In another advantageous embodiment, it is intended to assign the respective bottle or its printing material to the construction job in the control device and to store it therein. This solution enables tracing back the material used when construction jobs are incorrectly carried out. This makes it possible to hold the material manufacturer in liability, if required.

If a display device and a corresponding input device for user communication are provided on the stereolithography device according to the invention, it is also possible to provide instructions to the user if another bottle comprising a respective different or new printing material is to be used for a particular construction job.

The RFID tag can also be combined with a short-range RFID antenna. In this case, if the bottle is inserted incorrectly, no communication is possible and the construction job is blocked. This additionally is for safety of the stereolithography device operation.

According to the invention, it is particularly favorable if a special bottle is used for the printing material. It essentially has a cuboid basic structure, with a slightly conical bottle outlet. The area of the bottle cap which is suitable for a screw cap and therefore has an external thread is laterally reinforced by ribs which project from the cone.

These ribs ensure secure connection to the bottle holder, which is also liquid-tight, by pressing the bottle into the bottle holder.

At this position, the proximity sensor may also be placed as a capacitive proximity sensor according to the invention. For example, the arrangement is such that the proximity sensor or level sensor responds to a liquid level approximately 2 cm above the bottle outlet.

Furthermore, it is to be understood that the capacitive proximity sensor requires adaption to the printer material(s) used.

On the other hand, the RFID tag or mini memory device may be placed at any suitable position on the bottle, for example on the side of a wall.

A comparatively small wall thickness is important for the effectiveness of the level sensor. This requirement actually contradicts the stability of the bottle required for the liquid-tight approach of the bottle, but the two opposing requirements can be reconciled by the reinforcing ribs on the side of the bottle outlet.

In addition to the expiration date, the last use of the bottle is also stored in the RFID tag in the preferred configuration. If the final use has been longer than a specified period, for example two weeks, the user may be prompted via the stereolithography device display to shake the bottle to ensure uniform distribution of sediments and/or particles in the printed material.

According to the invention, the stereolithography device may be advantageously controlled such that a mixing movement is carried out through a relative movement between the tank and the construction platform immersed therein to mix a material stored for a longer period of time. The mixing time may be specified as default based on various storage times, whereby this information is automatically specified by the system, or may be calculated based on the storage time of the material.

In order to be able to mix the material, at least a construction platform movable in the z-direction and a trough or cartridge movable in the x and y directions is required, or a construction platform movable in the z-direction and/or x and y directions and a trough or cartridge movable in the x or y directions is required.

Further embodiments in connection with a tiltable construction platform 66 and/or tiltable trough 42 or cartridge 40 or further combinations thereof are conceivable.

If the bottle is pivotably supported, it may be advantageous to attach the RFID tag in the region of the filling level sensor, i.e. at the lower outlet end of the bottles. The reason for this may be that the range of RFID antennas is limited, and in such an arrangement, the distance travelled by the RFID tag when the bottle swivels is smaller, so that it can still be within the range of the RFID antenna.

Preferably, the RFID tag is attached such that a small distance from the sensor may be achieved. A value of about 5 mm has proved to be favorable herein, which takes into account the specimen dispersion and the bearing play of the bottle in the bottle holder, but still enabling reliable evaluation and communication.

BRIEF DESCRIPTION OF THE DRAWINGS

Further advantages, details and features will arise from the following description of several embodiments of the invention while making reference to the drawing, wherein.

DETAILED DESCRIPTION

Figure 1:
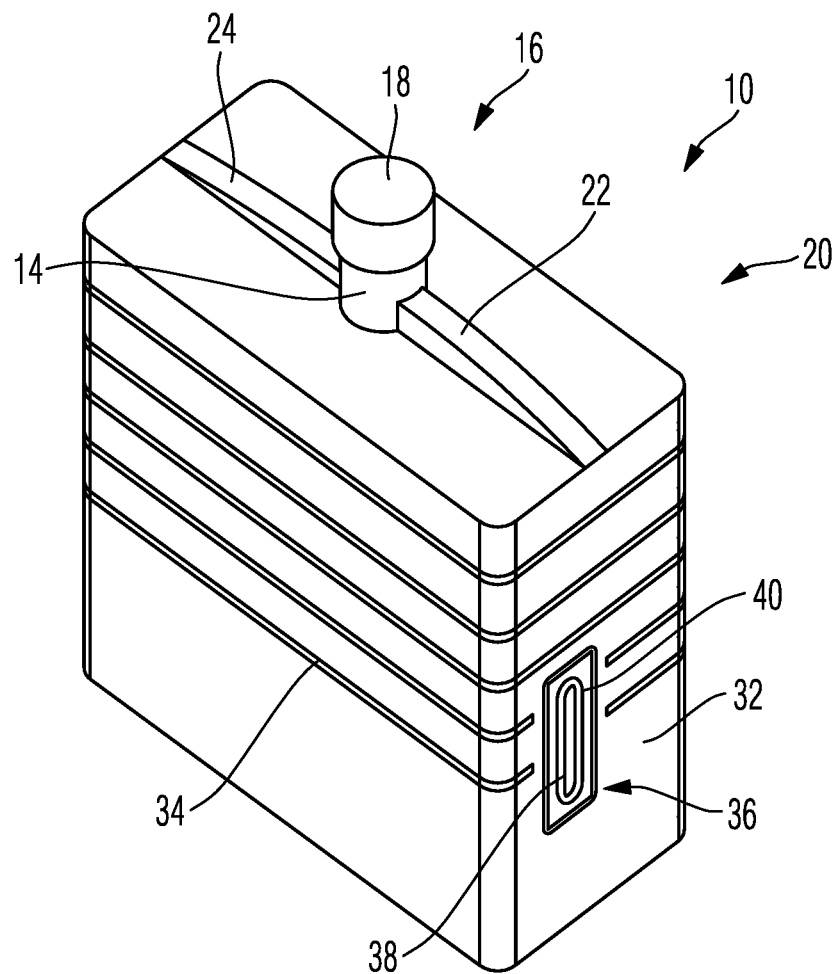
FIG. 1 is a schematic view of a bottle according to the invention for use in a stereolithography device according to the invention.
Figure 2:
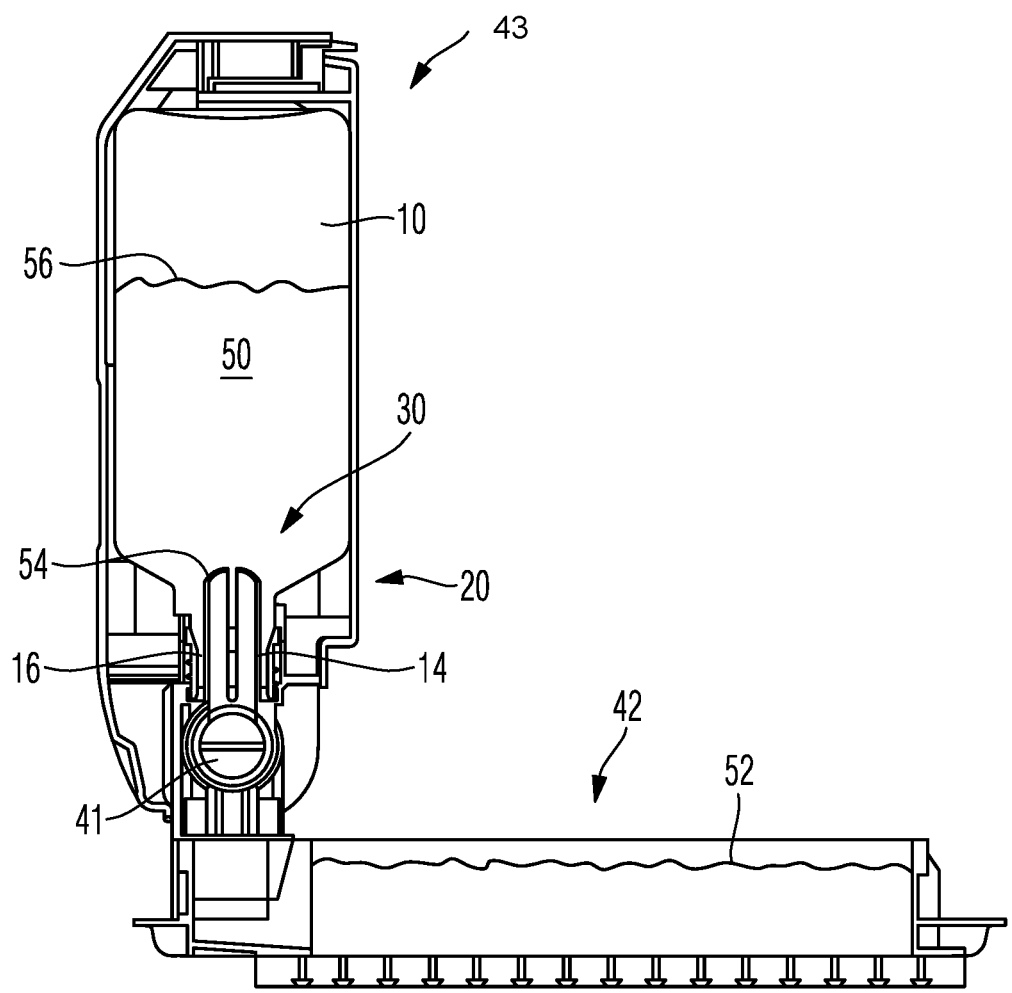
FIG. 2 is the storage of the bottle in the bottle holder and the associated cartridge of the stereolithography device.
Figure 3:
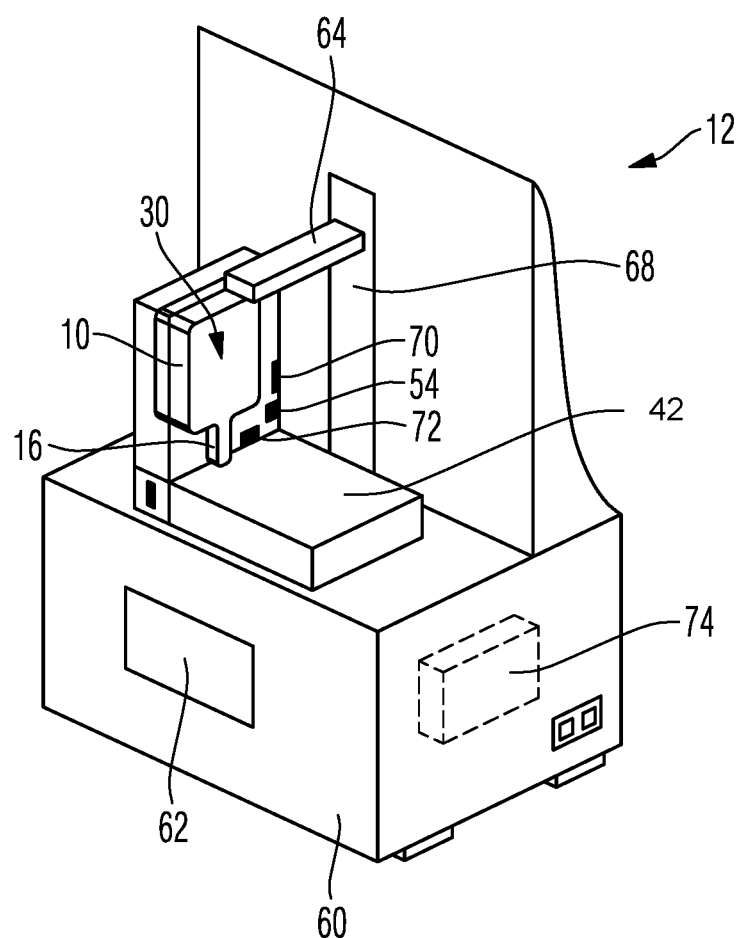
FIG. 3 is a schematic perspective view of a stereolithography device according to the invention.

The bottle 10 shown in FIG. 1 is to be received in the stereolithography device 12 shown for example in FIG. 3. The bottle is shown in FIG. 1 in the filling state, but in practice will be used upside down, as shown in FIGS. 2 and 3, for example. The bottle 10 is essentially cuboid. It has a bottle neck 14 and an outlet 16 with a screw thread in a manner known per se, which in the example herein is closed by a lid 18 known per se.

The bottle 10 consists of a comparatively thin-walled material. Its lower section 20—which is shown at the top of FIG. 1—is tapered down to the bottleneck 14. This section can be conical, as shown in FIG. 2, or essentially flat, as shown in FIGS. 1 and 3. In any case, it preferably comprises reinforcing ribs 22 and 24, which are used to absorb the force applied when inserting the bottle 10 into the bottle holder 30 (see FIG. 2, 3) and to discharge it to the walls 32 of the bottle 10.

In the embodiment shown in FIG. 1, the bottle 10 has additional stiffening ribs 34, which are not provided in the embodiment shown in FIGS. 2 and 3.

An RFID tag 36 is arranged on one of the walls 32 according to the invention. An RFID tag 36 consists of a small memory, the mini memory device 38, and a mini antenna 40, which is for communication to the outside world, as well as a control electronics. RFID tags themselves are known. The control electronics may be, but are not limited to, a CPU, embedded controller, ASIC, and the like.

The RFID tag 36 is attached to a narrow side wall of the bottle 10. This arrangement is preferred because the narrow sidewall is typically somewhat less flexible than the wide sidewall. The RFID tag is also quite close to the side corner and the side wall; typically, a rectangular bottle therein is also comparatively stiff.

In the example shown, the RFID tag 36 is attached at about the middle height of the bottle 10. Depending on the configuration, it may also be advantageous to arrange it somewhat further down—i.e. in the illustration according to FIG. 1 at the top—with the advantages mentioned above.

In any case, it is intended to provide an antenna for the RFID tag 36, in close proximity thereto, in or at the bottle holder 30.

In the embodiment according to FIG. 1, the RFID tag 36 is attached upright, but it is to be understood that it may as well be attached horizontally, as required.

The RFID tag is attached in the usual way by gluing it to the outside of the bottle so that the resulting RFID tag 36 is undetachably attached to the bottle 10.

FIG. 2 shows a possible arrangement of the bottle 10 in a cartridge 43 using the bottle holder 30. In this embodiment, the bottle 10 is provided with a conical section 20 which extends between the side walls 32 and the bottleneck 14. The outlet 16 is inserted into the holder 30 of the bottle 10. The bottle also comprises a rotary valve 41. The rotary valve 41 is open when the bottle 10 is in the position as shown in FIG. 2. On the other hand, it is closed when the bottle 10 is swiveled 90° to the right and accordingly comes to lie above a trough 42. The position of the cartridge 43 swiveled downwards corresponds to the transport position. When swiveled upwards, printing material 50 may flow from the bottle 10 through the outlet 16 and the rotary valve 41 into the trough 42.

Any measures known per se have been taken to maintain a liquid level 52 in the trough 42. For example, a so-called cattle or livestock waterer valve is suitable for this, which allows the liquid to enter the trough 42.

In the illustration according to FIG. 2, the level sensor 54 is arranged behind the bottle 10. The level sensor operates capacitively, measuring whether liquid is present or not at the point where the bottle 10 is adjacent to it. It is attached to the bottle holder 30, just above section 20 or on section 20.

This means that it triggers when the level 56 of the printing material 50 in the bottle 10 drops below this point. In this case, there is still some amount of printing material 50 available in the bottle 10. This amount will be calculated such that, in any case, it is sufficient to be used in stereolithography to produce, i.e. to slice, at least three components from the printing material 50 in the trough 42, the volume of said three components, for example, corresponding to an upper jaw prosthesis.

In this way it is ensured that the level 56 in the trough 42 is always sufficient for high-quality stereolithography.

FIG. 3 shows exemplary arrangements of the stereolithography device 12. The stereolithography device 12 comprises a housing 60 with a combined display device and operating device 62. The cartridge 40 is mounted on the housing 60 and corresponds to the representation according to FIG. 2, although FIG. 3 is much more schematized.

The bottle 10 is placed in the holder 30, with the outlet 16 downwards, so that printing material 50 can be delivered to the trough 42.

A support arm 64 extends above the trough 42 for the construction platform 66 (FIG. 4), which is not visible from FIG. 3. This construction platform may be traveled vertically via a drive 68, i.e. in the direction of the Z-axis.

Adjacent to the bottle 10 antennas 70 and 72 are provided for the detection of the RFID tag 36. They are attached to the holder 30 of the bottle 10. In addition, the level sensor 54 is arranged adjacent to the outlet 16 of the bottle 10.

During operation, the status of the mini memory device 38 (FIG. 1) is now read out via a control device 74 (FIG. 3), shown in dashed lines, on the RFID tag 36 of the bottle 10. Thus, various information about the printing material 50 in the bottle 10 will be provided to the control device 74.

Furthermore, the filling level sensor 54 detects the filling level of the printing material 50 in the bottle 10.

If all values are all right and match the selected construction job, this is displayed on the display device and following user confirmation, the respective construction job will be started.

The level sensor 54 is continuously scanned during the construction job. If during the construction job the filling level of the printing material 50 in the bottle 10 falls below a specified value, the construction job is still completed because there is still residual print material 50 in the bottle 10.

However, the next construction job is not released; but the user is rather prompted to change the bottle.

The control device 74 notices the bottle change and checks whether the printing material 50 in the bottle 10 matches the printing material 50 in the trough 42, as otherwise the output will be blocked.

This also prevents cross-contamination, if required. However, if cross-contamination cannot be completely ruled out, as some material has already entered the trough, cross-contamination is immediately detected and signaled.

The next construction job will not be released unless the correct printing material 50, i.e. the correct bottle 10, has been inserted into the holder 30.

Figure 4:
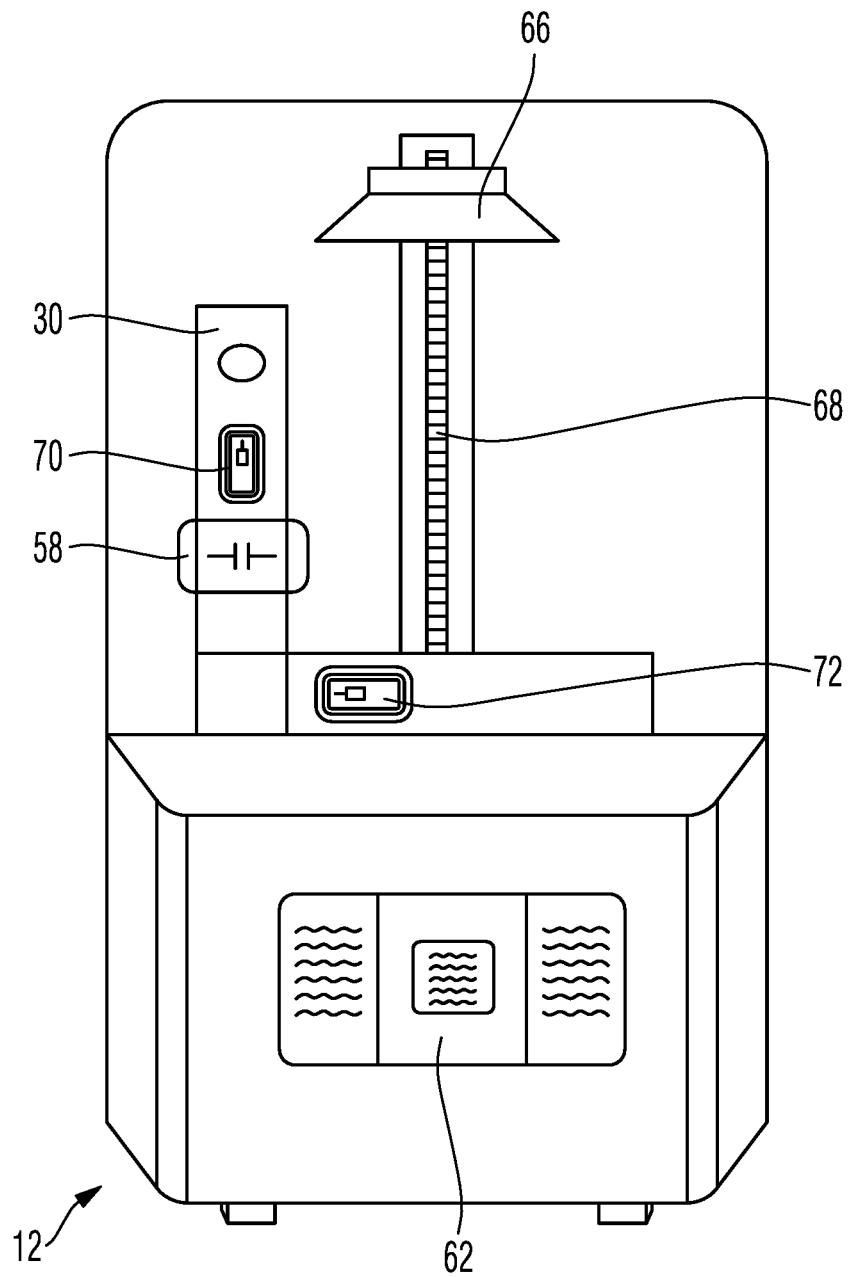
FIG. 4 is another embodiment of a stereolithography device according to the invention.

From FIG. 4, another embodiment of the stereolithography device 12 of the invention may be seen. Herein, as in the other figures, the same reference numbers correspond to the same or corresponding parts. In this embodiment, the holder 30 of the bottle 10 is equipped with the antenna 70 for the RFID tag 36 and in addition with the level sensor 58. An additional antenna 72 is provided which is for communication with the RFID tag 36 on the bottle 10 when the bottle 10 is in horizontal arrangement.

Figure 5:
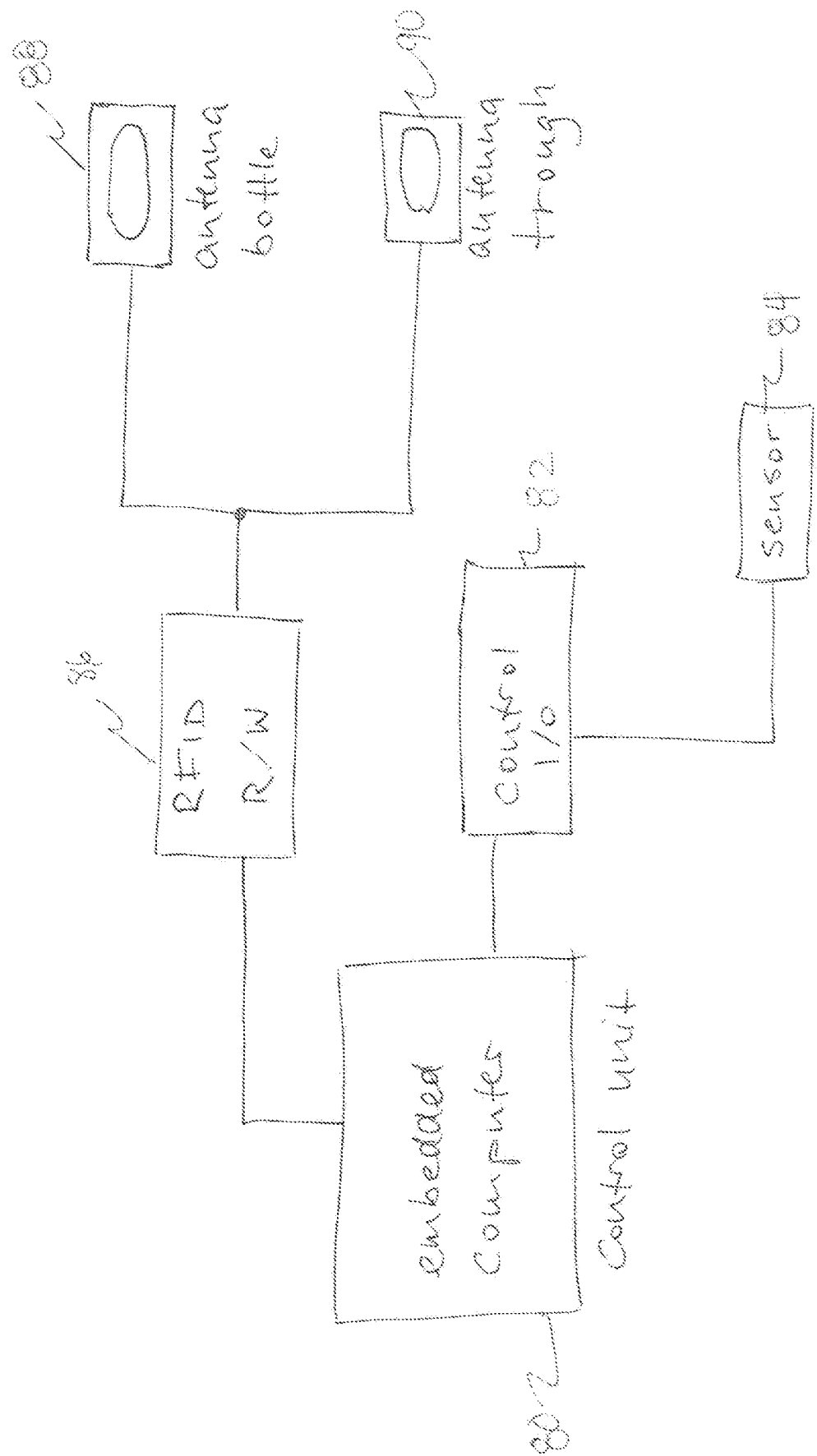
FIG. 5 is a block diagram of the connections of the components.

FIG. 5 shows the components in a circuitry diagram having a control unit 80 such as a computer and a control 82, a sensor 84, an RFID tag 86, an antenna 88 for the container and an antenna 90 for the trough.

In some embodiments, examples of a computer system and other hardware include a general-purpose computer, a Personal Computer (PC), a dedicated computer, a workstation, a Personal Communications System (PCS), a mobile (cellular) phone, a mobile phone with a data processing function, a Radio Frequency IDentification (RFID) receiver, a game machine, an electronic notepad, a laptop computer, a GPS receiver, and other programmable data processing apparatuses. It should be noted that in each embodiment, various operations are executed by a dedicated circuit (for example, individual logical gates interconnected in order to execute a particular function) implemented by program instructions (software), or by a logical block, program module, or the like executed by one or more processors. The one or more processors that execute a logical block, program module, or the like include, for example, one or more of a microprocessor, CPU, Application Specific Integrated Circuit (ASIC), Digital Signal Processor (DSP), Programmable Logic Device (PLD), Field Programmable Gate Array (FPGA), processor, controller, microcontroller, microprocessor, electronic device, other apparatus designed to be capable of executing the functions disclosed here, and/or a combination of any of the above.

In some embodiments implementation may be by hardware, software, firmware, middleware, microcode, or a combination of any of these. The instructions may be program code or a code segment for executing the necessary tasks. The instructions may be stored on a machine-readable, non-transitory storage medium or other medium. The code segment may indicate a combination of any of the following: procedures, functions, subprograms, programs, routines, subroutines, modules, software packages, classes, instructions, data structures, or program statements. The code segment may transmit and/or receive information, data arguments, variables, or memory content to or from another code segment or hardware circuit in order for the code segment to connect to another code segment or hardware circuit.

The storage used here may also be configured by a computer-readable, tangible carrier (medium) in the categories of solid-state memory, magnetic disks, and optical discs. Data structures and an appropriate set of computer instructions, such as program modules, for causing a processor to execute the techniques disclosed herein are stored on these media. Examples of computer-readable media include an electrical connection with one or more wires, a magnetic disk storage medium, a magnetic cassette, a magnetic tape, or other magnetic or optical storage medium, such as a Compact Disc (CD), laser Disc, Digital Versatile Disc (DVD), Floppy disk, and Blu-ray Disc. Further examples include a portable computer disk, Random Access Memory (RAM), Read-Only Memory (ROM), rewritable programmable ROM such as Erasable Programmable Read-Only Memory (EPROM), Electrically Erasable Programmable Read-Only Memory (EEPROM), or flash memory, another tangible storage medium that can store information, or a combination of any of these. The memory may be provided internal and/or external to a processor or processing unit. As used in this disclosure, the term "memory" refers to all types of long-term storage, short-term storage, volatile, non-volatile, or other memory. No limitation is placed on the particular type or number of memories, or on the type of medium for memory storage.

In some embodiments, the processor is in communication over a network, which could be wired or wireless, with an external processor used for performing one or more calculation steps and/or a network-attached electronic data storage unit.

In some embodiments, the present disclosure makes use of cloud computing to perform one or more calculations steps remotely and/or remote storage to enable the storage of data remotely for collaborative or remote analysis.

In some embodiments, the system comprises a plurality of graphical user interfaces to permit multiple users to view or analyze the same data.

In some embodiments, the operations are performed in real-time.

Although the invention is illustrated above, partly with reference to some preferred embodiments, it must be understood that numerous modifications and combinations of different features of the embodiments can be made. All of these modifications lie within the scope of the appended claims.

The invention claimed is:

1. A stereolithography device comprising
an exchangeable bottle for receiving printing material,
wherein the bottle is storable in or on a bottle holder,
wherein printing material is extractable from the bottle by the bottle holder on the stereolithography device,
wherein a filling level sensor is provided on the bottle holder of the stereolithography device for detecting the printing material,
wherein a filling level of the printing material in the bottle can be detected,
wherein a memory device is attached to and assigned to the bottle,
wherein, in the memory device, information is stored regarding the printing material located in the bottle, the stored information comprising the filling level of the printing material, and
wherein a device-side accommodation of the bottle holder is in flow connection with a trough which can be filled with printing material and into which a construction platform of the stereolithography device is configured for introduction into the construction platform.

2. The stereolithography device according to claim 1, wherein the filling level sensor is provided on the bottle holder laterally of the bottle.

3. The stereolithography device according to claim 1, comprising
a control device which calculates the consumption of printing material based on the sliced surfaces.

4. The stereolithography device according to claim 1, wherein the memory device is formed in or on an RFID tag attached to the bottle.

5. The stereolithography device according to claim 1, wherein the stereolithography device comprises an RFID antenna adapted for bidirectional communication with an RFID tag on the bottle and connected to the control device of the stereolithography device.

6. The stereolithography device according to claim 5, wherein the bottle is mounted on the bottle holder or, together therewith, is pivotally mounted in the stereolithography device, and
wherein the bidirectional communication between the RFID antenna and the RFID tag operates in the upright pivotal state of the bottle.

7. The stereolithography device according to claim 1, wherein the bottle is deposited in the bottle holder so as to be non-rotatable and with a pouring outlet or spout at a bottom.

8. The stereolithography device according to claim 7, wherein the pouring spout of the bottle has reinforcing ribs projecting to and from a neck of the bottle, above which the level sensor is mounted, as viewed in a position with the pouring spout facing downwards.

9. The stereolithography device according to claim 1, wherein the flow connection into the trough is realized via a livestock watering trough outlet, from which printing material from the bottle can automatically be supplied when a filling level of the trough declines.

10. The stereolithography device according to claim 1, wherein the level sensor triggers when the bottle contains a residual volume of printing material of less than 10 cubic centimeters, and
wherein the printing material in the trough is for slicing at least one dental arch.

11. The stereolithography device according to claim 1, wherein a control device of the stereolithography device inhibits a start of a printing operation when the level sensor indicates that there is insufficient printing material in the bottle and/or the trough.

12. The stereolithography device according to claim 1, wherein the level sensor is formed as a capacitive sensor mounted in or on the stereolithography device adjacent to a lower end of the bottle at about 1 to 20 mm away from the bottle.

13. The stereolithography device according to claim 1, wherein the control device stores at least one of type of bottle, type of printing material located in the bottle, size of the bottle, date of manufacture of the printing material in the bottle, start of consumption of the printing material from the bottle, type of printing material and/or final use of the bottle based on communication between an RFID antenna and an RFID tag.

14. The stereolithography device according to claim 4, wherein, in addition to the RFID tag, a QR code or a barcode which stores relevant properties of the printing material present in the bottle is attached to or on the bottle.

15. A bottle or liquid-tight container for a stereolithography device which can be inserted into a bottle holder of the stereolithography device, comprising
a wall thickness which is permeable to a capacitive, filling level sensor (54) and is less than 2 mm,
a memory device (38) attached to a wall of the bottle (10),
wherein the wall of the bottle (10) is non-metallic and free from metallic coatings at least at a point adjacent to a bottle outlet.

16. The bottle according to claim 15,
wherein the wall thickness is less than 1 mm, and
wherein the memory device (38) comprises an RFID tag.

\* \* \* \* \*